United States Patent [19]

Ohtsuka

[11] Patent Number: 5,357,928
[45] Date of Patent: Oct. 25, 1994

[54] FUEL INJECTION CONTROL SYSTEM FOR USE IN AN INTERNAL COMBUSTION ENGINE

[75] Inventor: Masahito Ohtsuka, Shizuoka, Japan

[73] Assignee: Suzuki Motor Corporation, Shizuoka, Japan

[21] Appl. No.: 12,549

[22] Filed: Feb. 2, 1993

[30] Foreign Application Priority Data

Mar. 25, 1992 [JP] Japan ................................. 4-097284
Mar. 27, 1992 [JP] Japan ................................. 4-100255

[51] Int. Cl.$^5$ ................................. F02D 43/00
[52] U.S. Cl. ................................. 123/424; 60/284; 123/491
[58] Field of Search ............... 123/424, 491, 685, 686; 60/274, 276, 284, 285

[56] References Cited

U.S. PATENT DOCUMENTS

5,050,551  9/1991  Morikawa ..................... 123/435
5,211,011  5/1993  Nishikawa et al. ............. 60/285 X

FOREIGN PATENT DOCUMENTS

61-76741   4/1986  Japan .
2-259279  10/1990  Japan .

Primary Examiner—Tony M. Argenbright
Attorney, Agent, or Firm—Flynn, Thiel, Boutell & Tanis

[57] ABSTRACT

A fuel injection control system for use in an internal combustion engine having a catalyst in its exhaust path. Each cylinder is provided with a fuel injection valve for injecting fuel thereinto amounting to a reference injection quantity which is set according to a loaded state of the internal combustion engine. Each cylinder is also provided with a spark plug for producing spark ignition therein at each period of reference ignition timing which is established according to the loaded state of the internal combustion engine. The fuel injection control system is provided with a controller which controls the fuel injection valve such as to increase and decrease the reference fuel injection quantity by a different amount per cylinder without a change in the total of the reference fuel injection quantity, and which also varies this fuel increase and decrease according to the loaded state of the internal combustion engine. The controller further controls the spark plug such as to retard the reference ignition timing by an amount different from one cylinder to another, and varies this retardation according to the loaded state of the internal combustion engine. This control is effected when the internal combustion engine is in an operating state which conforms to predetermined conditions.

2 Claims, 8 Drawing Sheets

| | | FIRST PHASE | SECOND PHASE | THIRD PHASE | FORTH PHASE | FIFTH PHASE |
|---|---|---|---|---|---|---|
| THROTTLE OPENING | | th < 20% | 20% ≦ th < 40% | 40% ≦ th < 60% | 60% ≦ th < 80% | 80% ≦ th |
| FUEL INJECTION QUANTITIES | F1 | -2% | -4% | -6% | -8% | -10% |
| | F2 | +2% | +4% | +6% | +8% | +10% |
| | F3 | 0% | 0% | 0% | 0% | 0% |
| IGNITION TIMING | T1 | -2° | -3° | -4° | -5° | -6° |
| | T2 | -4° | -6° | -8° | -10° | -12° |
| | T3 | 0° | 0° | 0° | 0° | 0° |

| THROTTLE OPENING | | FIRST PHASE th<20% | SECOND PHASE 20%≦th<40% | THIRD PHASE 40%≦th<60% | FORTH PHASE 60%≦th<80% | FIFTH PHASE 80%≦th |
|---|---|---|---|---|---|---|
| FUEL INJECTION QUANTITIES | F1 | -2% | -4% | -6% | -8% | -10% |
| | F2 | +2% | +4% | +6% | +8% | +10% |
| | F3 | 0% | 0% | 0% | 0% | 0% |
| IGNITION TIMING | T1 | -2° | -3° | -4° | -5° | -6° |
| | T2 | -4° | -6° | -8° | -10° | -12° |
| | T3 | 0° | 0° | 0° | 0° | 0° |

FUEL INJECTION CONTROL SYSTEM FOR USE IN AN INTERNAL COMBUSTION ENGINE

FIELD OF THE INVENTION

This invention relates to a fuel injection control system for use in an internal combustion engine. More particularly, it concerns a fuel injection control system for the internal combustion engine, in which a catalyst is brought into rapid activation at the time of a cold startup of the internal combustion engine without detracting from operability at a light-loaded operation phase of the engine, thereby allowing an exhaust-purifying function to be promptly exercised to achieve exhaust gas purification.

This invention also relates to a fuel injection control system for use in an internal combustion engine and, more particularly, to a fuel injection control system for the internal combustion engine in which the occurrence of noxious exhaust ingredients can successfully be reduced by a rapid rise in catalyst temperatures at the time of low temperature-starting of the internal combustion engine.

BACKGROUND OF THE INVENTION

In many internal combustion engines disposed in a vehicle such as an automobile and the like, a catalyst for purifying exhaust gases is provided in an exhaust path of the engine in order to achieve exhaust gas purification. The catalyst is activated at given temperatures thereof to perform an exhaust-purifying function. To accomplish this, the catalyst preferably maintains preset temperatures so as to exercise a full degree of exhaust-purifying performance.

Also, in some internal combustion engines for use in vehicles, a fuel injection control system is provided for attempting to meet problems with noxious exhaust ingredients, specific fuel consumption, and the like. Variations in an operating state of the internal combustion engine, such as engine loads, an engine speed, cooling water temperatures, and an intake air quantity, are entered into the fuel injection control system as electric signals. The fuel injection control system then actuates fuel injection valves with each period of ignition according to values of the electric signals. A fuel injection quantity is thereby controlled.

Examples of the above are disclosed by Japanese Patent Application Laid-Open No. 61-76741 and Japanese Patent Application Laid-Open No. 2-259279.

According to one example of the above Application No. 61-76741, when steady-state travel of a vehicle is continued, ignition timing is retarded to prevent catalyst temperatures from dropping below predetermined temperatures thereof. At the same time, a power deficiency due to retarded ignition timing is compensated by an idle speed control valve being opened.

According to the other example of above Application No. 2-259279, when a rotational frequency during idling is lower than its target value, reference ignition timing is corrected for an advance angle side so as to produce ignition of the internal combustion engine in a thus corrected setting. Engine power is thereby increased to raise the rotational frequency. When the rotational frequency is higher than its target value, the reference ignition timing is corrected for a delay angle side so as to lower the rotational frequency. This Continual feedback of the rotational frequency converges the engine speed on its target value. When the engine has a lower temperature, the reference ignition timing during idling is set to the delay angle side by a corresponding amount. Stable idling running is thereby provided even at cold temperatures of the engine. This also encourages the catalyst to accelerate engine warm-up, while enhancing both stability of engine idling speed and engine stalling-resistance to external loads at cold temperatures of the engine.

Also, in the internal combustion engine with the fuel injection control system, in order to promote activity of a catalyst by a rise in catalyst temperatures at the time of low temperature-starting of the engine, ignition timing is delayed by a given angle (for example, four degrees) under the control of an electronic-controlled ignition control device for a given length of time or until a predetermined cooling water temperature is reached after the internal combustion engine is started. The combustion state is thereby changed.

In previous fuel injection control systems for use in an internal combustion engine, ignition timing is delayed by a fixed value (four degrees) at the time of low temperature-starting of the internal combustion engine, to change the combustion state so as to raise catalyst temperatures. However, the rate of rise in catalyst temperatures is too low to sufficiently curtail noxious exhaust ingredients such as high carbon and the like. Thus, there is an inconvenience in that retarded ignition timing alone fails to sufficiently activate the catalyst. In addition, in view of noxious exhaust ingredient-related regulations, which have recently been even more tightened, simply retarded ignition timing has a disadvantage in its inability to meet these regulations. Furthermore, there is another inconvenience in that such retarded ignition timing detracts from operability at a light-loaded operation phase of the internal combustion engine.

In order to eliminate the above-mentioned inconveniences, the present invention provides a fuel injection control system for use in an internal combustion engine having a catalyst at its exhaust path, characterized in that: each cylinder is provided with a fuel injection valve for injecting fuel thereinto amounting to a reference injection quantity which is set according to a loaded state of the internal combustion engine; each cylinder is provided with a spark plug for producing spark ignition therein at each period of reference ignition timing which is established according to the loaded state of the internal combustion engine; and, the fuel injection control system is provided with a controlling means, which controls the fuel injection valve such as to increase and decrease the reference fuel injection quantity by a different amount per cylinder without a change in a total of the reference fuel injection quantity, and in addition varies this fuel increase and decrease according to the loaded state of the internal combustion engine; the controlling means further controls the spark plug such as to retard the reference ignition timing by an amount different from one cylinder to another, and in addition varies this retardation according to the loaded state of the internal combustion engine, such control being effected when the internal combustion engine is in an operating state which conforms to predetermined conditions.

According to the above structure of the present invention, when an internal combustion engine is operated in a state which complies with predetermined conditions, a reference fuel injection quantity is regulated by a controlling means so as to increase or decrease by an amount varying with cylinders without a change in a total of the reference fuel injection quantity. At the same time, such a fuel increase or decrease is regulated by the controlling means so as to vary according to a loaded state of the internal combustion engine. Furthermore, reference ignition timing is controlled by the controlling means so as to retard by an amount different from one cylinder to another. At the same time, such a retardation is controlled by the controlling means so as to vary according to the loaded state of the internal combustion engine. As a consequence, ignition timing is, of course, retarded; what's more, a fuel injection quantity varies with the cylinders according to the loaded state of the engine, while a total of the fuel injection quantity remains unchanged, thereby feeding fuel thereinto. Moreover, the ignition timing varies with the cylinders in dependence upon the loaded state of the engine, thereby producing spark ignition therein.

The present invention also provides a fuel injection control system for use in an internal combustion engine having multi-cylinders to control injection of fuel into the internal combustion engine by means of fuel injection valves in response to an ignition signal, the fuel injection control system comprising: a controlling means which alters a proportion of a fuel injection quantity between the cylinders while maintaining constant the total amount of fuel injected into the internal combustion engine with each period of ignition when the internal combustion engine is started at low temperatures, the controlling means changing each delay angle of ignition timing per cylinder.

According to the above structure of the present invention, a fuel injection quantity and ignition timing per cylinder are varied with each period of ignition at the time of low temperature-starting of an internal combustion engine, i.e., when a cold engine is started. As a result, catalyst temperatures rise faster than in previous cases, which further accelerates activity of a catalyst. The occurrence of noxious exhaust ingredients can thereby be reduced successfully.

Details of embodiments according to the present invention will now be provided with reference to the accompanying drawings.

DETAILED DESCRIPTION

FIG. 1 through FIG. 5 show an embodiment of the present invention.

Figure 1:
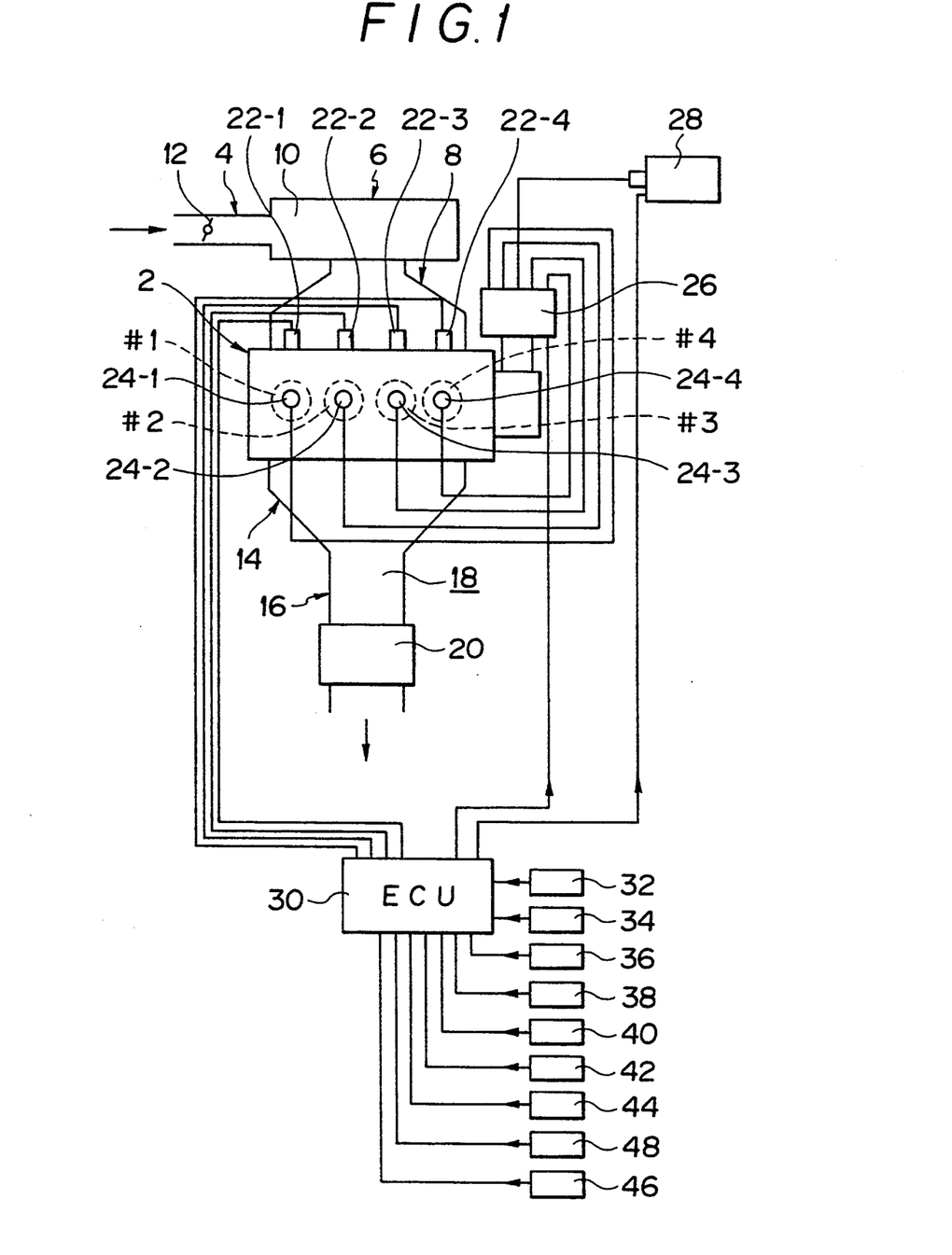
FIG. 1 is a schematic block diagram of a fuel injection control system for use in an internal combustion engine, showing an embodiment according to the present invention.

Referring to FIG. 1, reference numeral 2 represents an internal combustion engine disposed in a vehicle. An air cleaner (not shown), a suction pipe 4, a surge tank 6, and an intake manifold 8 are connected in sequence to the internal combustion engine 2, with an inlet path or passage 10 being connected between cylinder #1 and cylinder #4. A throttle valve 12 is provided within the inlet part 10. In addition, an exhaust manifold 14, an exhaust pipe 16, and a muffler (not shown) are connected in sequence to the internal combustion engine 2, with an exhaust path or passage 18 being connected between the cylinder #1 and the cylinder #4.

In the internal combustion engine 2, a catalyst 20 for purifying exhaust gases is provided in the exhaust path 18. In addition, in the engine 2, fuel injection valves 22-1 to 22-4 are respectively provided for the cylinders #1 to #4. Furthermore, spark plugs 24-1 to 24-4 are respectively provided for the cylinders #1 to #4.

The fuel injection valves 22-1 to 22-4 are connected to a fuel tank (not shown). As detailed hereinafter, a control station 30 (such as a programmable computer) controls between the fuel injection valves 22-1 to 22-4 in such a way that fuel amounting to a reference fuel injection quantity, which is set according to a loaded state of the internal combustion engine 2, is injected alternately into one of cylinders #1 to #4. The spark plugs 24-1 to 24-4 are connected to a distributor 26, which in turn is connected to an ignition coil 28. As detailed hereinafter, the control station 30 controls the spark plugs 24-1 to 24-4 such as to produce spark ignition alternately in one of the cylinders #1 to #4 at reference ignition timing, which is established according to the loaded state of the internal combustion engine 2.

The control station 30, which acts as a controlling means, connects with: the fuel injection valves 22-1 to 22-4; the spark plugs 24-1 to 24-4; the distributor 26; and the ignition coil 28. The control station 30 further connects with: an idle switch 32, which is put to "ON" at the time of idling running of the internal combustion engine 2; a vehicle velocity sensor 34 for detecting vehicle speed; a crank angle sensor 36 for detecting rotation angles of the engine crank shaft; an engine speed sensor 38 for detecting engine speed; a throttle-opening sensor 40 for detecting an opening degree of the throttle valve 12; a cooling water temperature sensor 42 for sensing temperatures of cooling water in the internal combustion engine 2; an intake-air temperature sensor 44 for sensing temperatures of air inducted into the inlet path 10; an ignition coil sensor 48 for entering an ignition pulse into the control station 30; and a catalyst temperature sensor 46 for sensing temperatures of the catalyst 20. A throttle-opening signal fed from the throttle-opening sensor 40 may be replaced with any other signal which represent a loaded state of the engine 2, for example, a suction pipe negative pressure signal.

According to signals entered from the sensors 32 through 48, the control station 30 controls fuel flow to and between the fuel injection valves 22-1 to 22-4 such as to inject fuel amounting to the reference fuel injection quantity, which is set in accordance with the loaded state of the internal combustion engine 2, into the cylinders #1 through #4 in sequence. It also controls between the first spark plug 24-1 through the fourth spark plug 24-4 such as to produce spark ignition in the cylinders #1 through #4 in turn at the reference ignition timing which is established according to the loaded state of the internal combustion engine 2.

As shown in FIG. 2 through FIG. 5, when the internal combustion engine 2 is operated in a state which fulfills predetermined conditions, the control station 30 controls each of the fuel injection valves 22-1 through 22-4, in response to the signals from the above-noted sensors, such as to increase and decrease the reference fuel injection quantity by amount "F" different from the cylinder #1 to the cylinder #4 without a change in the total of the reference fuel injection quantity, and in addition changes this fuel increase and decrease "F" to alternately one of "F1" to "F3" according to the loaded state of the internal combustion engine 2. The control station 30 further controls each of the spark plugs 24-1 through 24-4 such as to retard the reference ignition timing by amount "T" different from one cylinder #1 to the cylinder #4, and in addition changes this retardation "T" to alternately one of "T1" to "T3" according to the loaded state of the internal combustion engine 2.

In greater detail, it depends upon cooling water temperature "t", engine speed "Ne", vehicle velocity "V", and idle switch 32 to determine whether or not a running state of the internal combustion engine 2 fulfills the predetermined conditions. It can be determined that the running state of the engine 2 meets the predetermined conditions when the following states are found: cooling water temperature "t" is equal to or less than set value "t1" (° C.) thereof; engine speed "Ne" (rpm) is equal to or greater than a first set value "N1" thereof and is less than a second set value "N2" thereof; vehicle velocity "V" (km/h) is equal to or greater than a first set value "V1" thereof and is less than a second set value "V2" thereof; and the idle switch 32 is "OFF". When any one of these conditions is not satisfied, it can be determined that no preset conditions are met. Alternately, temperatures of the catalyst 20, which is detected by the catalyst temperature sensor 46, may be added as one condition to determine an operating state of the engine 2.

Accordingly, it can be determined that the internal combustion engine 2 is in a cold state, depending on whether or not cooling water temperature "t" is equal to or less than set value "t1". Operability at low and high revolution speed limits can be taken account of when engine speed "Ne" lies within a set limit (i.e., "Ne" is equal to or greater than "N1" and is less than "N2"). A low vehicle velocity limit and a racing state can be taken account of when vehicle velocity "V" lies within a set limit (i.e., "V" is equal to or greater than "V1" and is less than "V2"). When the idle switch 32 is "OFF", operability can be taken account of without such control being effected during idling running of the engine 2.

Figure 5:
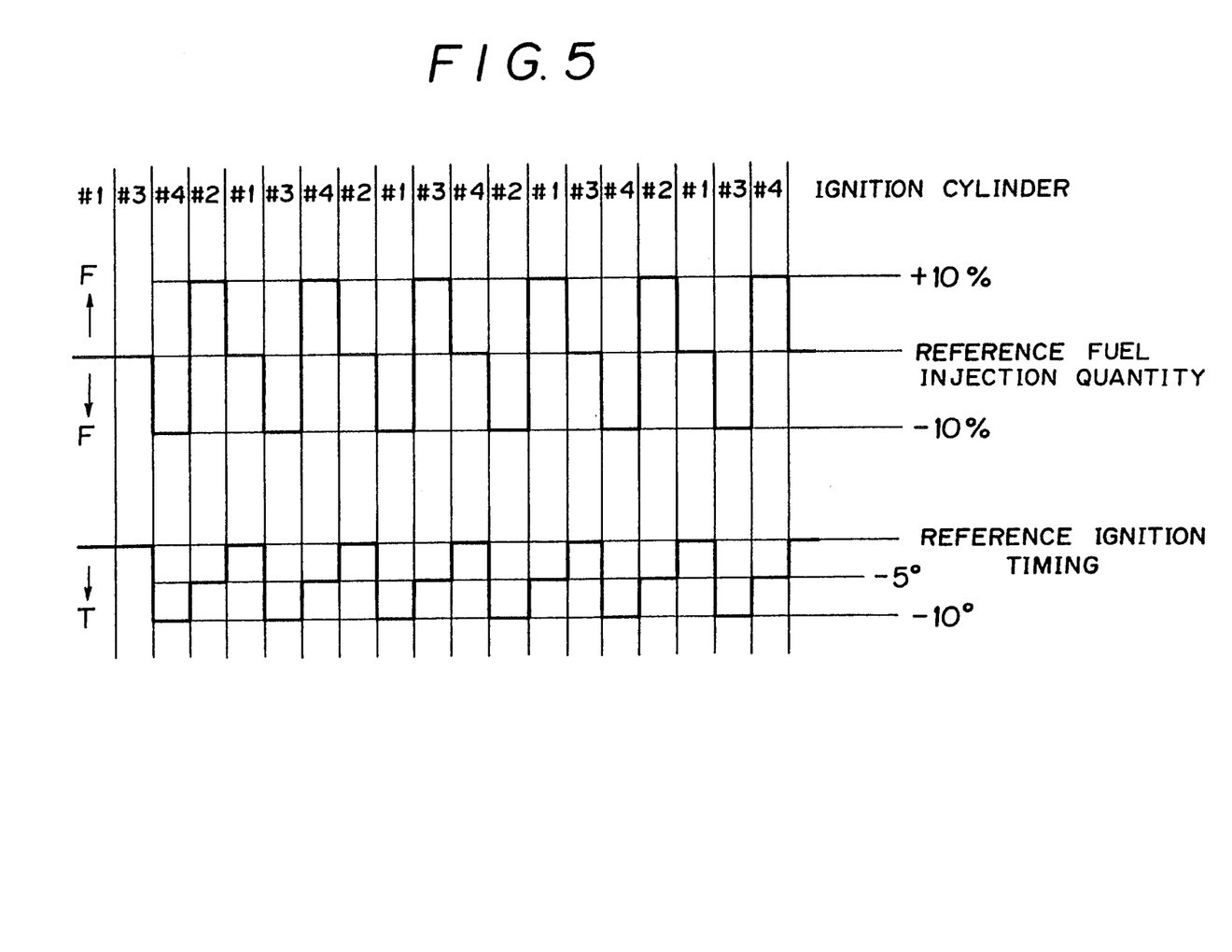
FIG. 5 is a timing chart, in which the fuel injection quantity increases and decreases and the ignition timing is retarded for each of the cylinders according to the loaded state of the internal combustion engine.

As shown in FIG. 5, when the predetermined conditions are fulfilled, the reference fuel injection quantity is regulated so as to increase or decrease by amount "F" varying between cylinder #1 and cylinder #4, with the total of the reference fuel injection quantity remaining unchanged. Furthermore, the reference ignition timing is controlled so as to retard by amount "T" varying between cylinder #1 and cylinder #4. In order to vary fuel increase or decrease "F" and ignition timing retardation "T" according to the cylinders #1 to #4 in the above manner, specific conditions of variations in amounts "F" and "T" with each of the cylinders #1 to #4 must be prevented from being concentrated on certain cylinders of the internal combustion engine 2. Accordingly, fuel increase and decrease "F" and ignition timing retardation "T", which must differ from one cylinder to another, vary on a "three"-phase basis with reference to "four" i.e., the number of the cylinders of the internal combustion engine 2. In other words, a variation pattern equal to the number of the cylinders minus one is formed with reference to the total numbers of the cylinders, i.e., "four". Periods of variations in amounts "F" and "T" for each of the cylinders #1 to #4 are thereby correspondingly shifted so as to prevent the above-noted specific conditions from being concentrated on certain cylinders of the internal combustion engine 2. This is diagrammatically illustrated in FIG. 3. Alternatively, phases at which such variations occur may be offset from one another with reference to the number of the cylinders; therefore, the present invention is not limited to the above-described variation pattern of "the number of the cylinders minus one".

Figure 3:
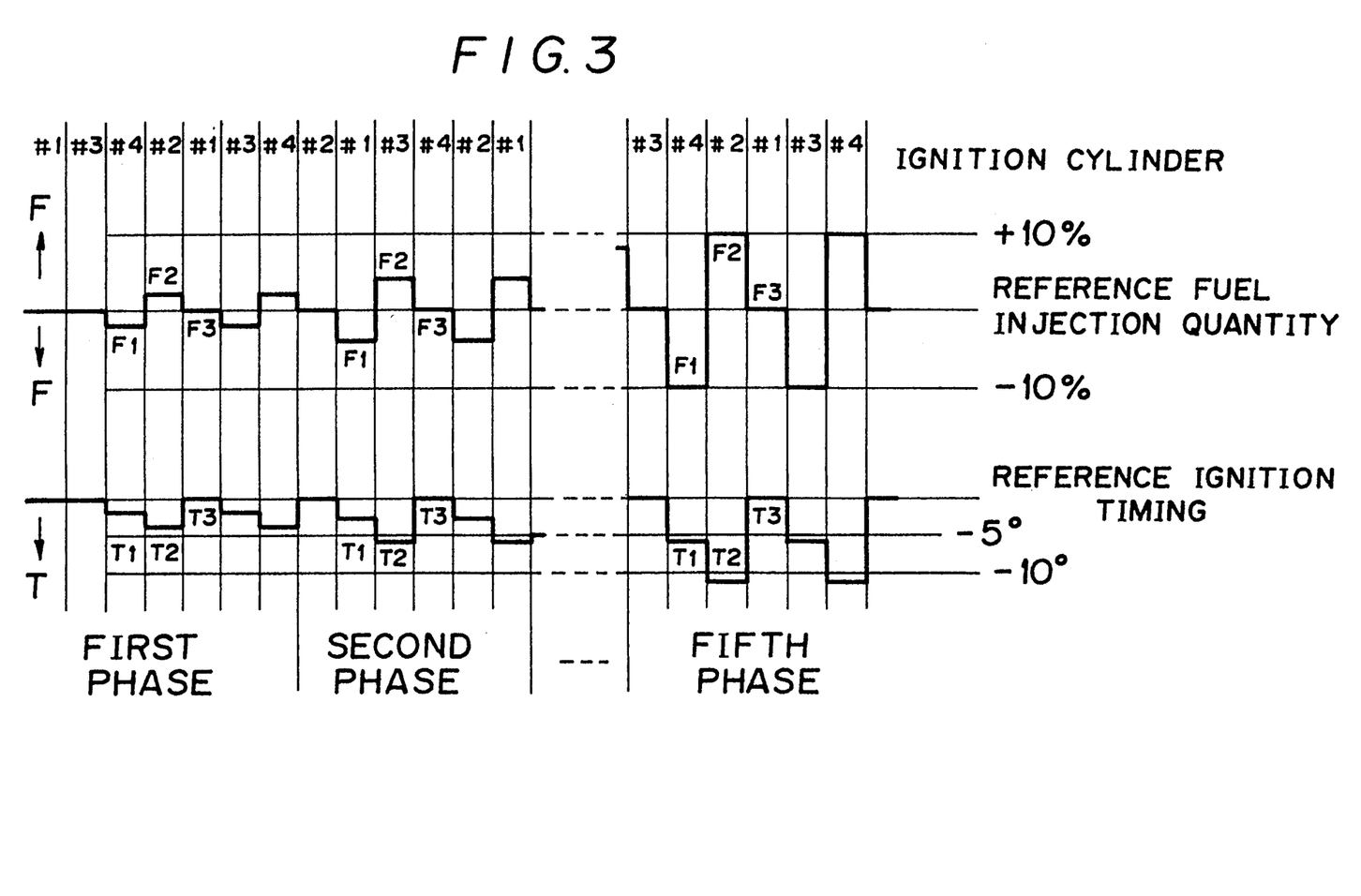
FIG. 3 is a timing chart, in which a fuel injection quantity and ignition timing vary with cylinders according to a loaded state of the internal combustion engine.
Figure 4:
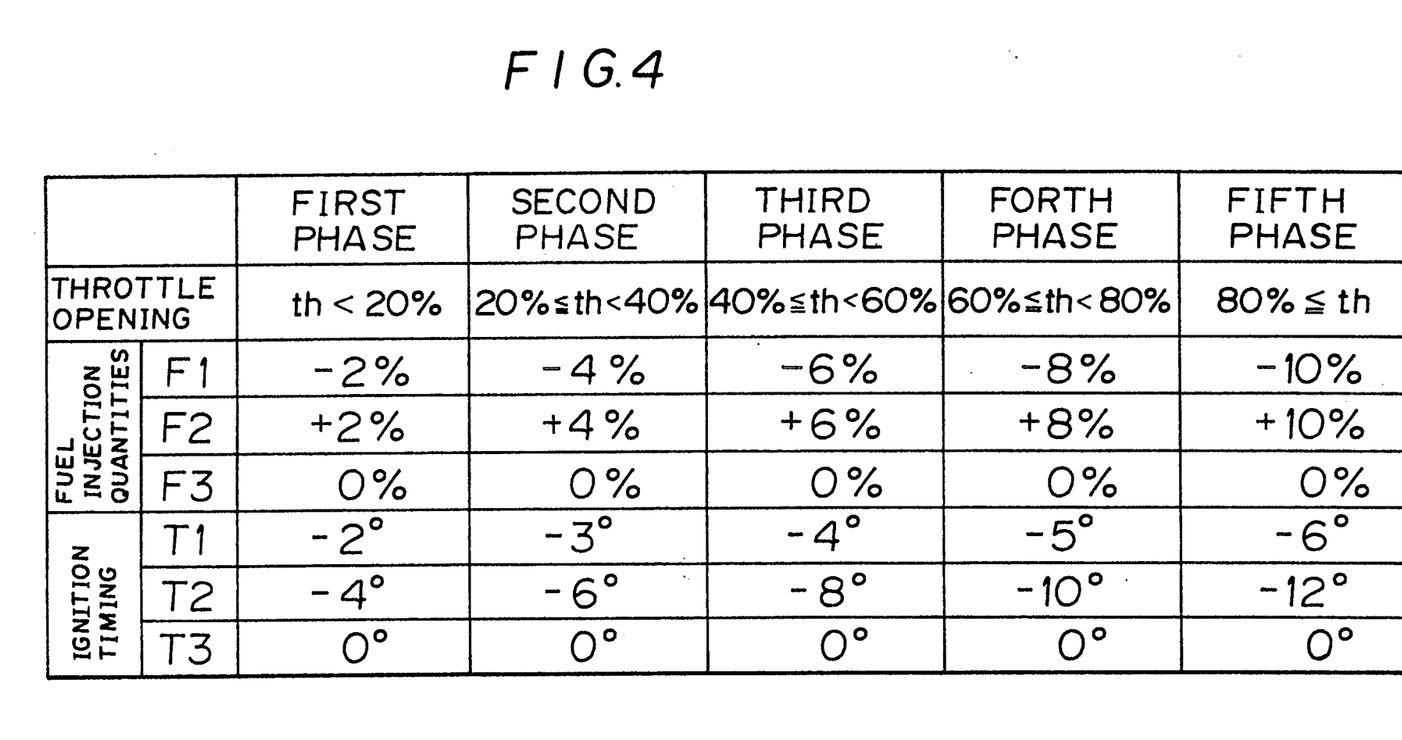
FIG. 4 is a control value map illustrating throttle opening and control valves for fuel injection quantities and ignition timing, which is set according to variations in a fuel increase and decrease and an ignition timing retardation between a first phase and a fifth phase, the phases being established in accordance with the loaded state of the internal combustion engine.

Referring to FIG. 3 and FIG. 4, fuel increase and decrease "F", which is thus adapted to vary between the cylinders #1 to #4, is regulated so as to change alternately to one of "F1" to "F3" in dependence on the loaded state of the internal combustion engine 2. At the same time, ignition timing retardation "T" thus adapted to vary between the cylinders #1 to #4 is controlled so as to change alternately to one of "T1" to "T3" in dependence on the loaded state of the engine 2. To be specific, as can be seen from FIG. 4, the loaded state of the internal combustion engine 2 is classified into five categories, namely a first phase to a fifth phase in accordance with the degree of throttle opening "th". According to the loaded state of the engine 2, the fuel increases or decreases between "F1" and "F3" and the ignition timing retardations between "T1" and "T3" are then read from a control value map (such as FIG. 4), in which the amounts of "F1" to "F3" and "T1" to "T3" are set to differ from the first phase to the fifth phase. As illustrated in FIG. 3, a fuel injection quantity and ignition timing vary, according to the load state of the engine 2, with the fuel increases and decreases of "F1" to "F3" and the ignition timing retardations of "T1" to "T3", which are read from the above-described control value map. This means that variations in the fuel injection quantity and the ignition timing decrease with a decreasing load, while increasing a great deal with an increasing load.

As a consequence, when the running state of the internal combustion engine 2 fulfills the predetermined conditions, the control station 30 controls the fuel injection valves 22-1 through 22-4 such as to increase and decrease the reference fuel injection quantity by amount "F" different from the cylinder #1 to the cylinder #4 without a change in the total of the reference fuel injection quantity, and in addition changes this fuel increase or decrease "F" alternately to one of values "F1" to "F3" according to the loaded state of the internal combustion engine 2. The control station 30 further controls the spark plugs 24-1 through 24-4 such as to retard the reference ignition timing by amount "T" different from the cylinder #1 to the cylinder #4, and in addition changes this retardation "T" alternately to one of values "T1" to "T3" according to the loaded state of the engine 2.

Next, the operations of the embodiment of the invention will be described.

Figure 2:
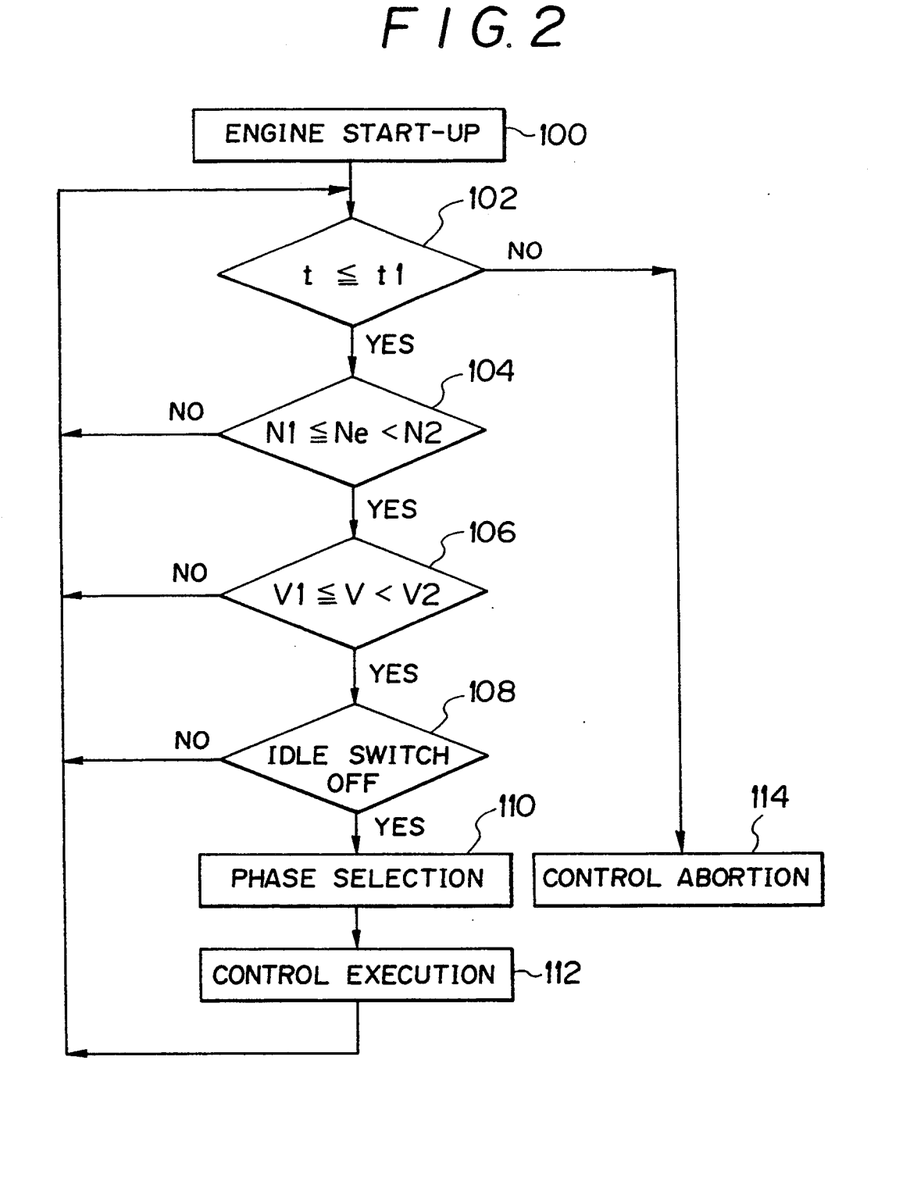
FIG. 2 is a control flow chart.

Referring to FIG. 2, when the internal combustion engine 2 is started (step 100), the control station 30 determines whether or not a running state of the engine 2 fulfills the predetermined conditions (step 102 through step 108).

To be specific, it is determined at step 102 whether or not cooling water temperature "t" is equal to or less than set value "t1". It is then determined at step 104 whether or not engine speed "Ne" lies within the set limit (i.e., "Ne" is equal to or greater than "N1", but is less than "N2"). It is thereafter determined at step 106 whether or not vehicle velocity "V" lies within the set limit (i.e., "V" is equal to or greater than "V1", but is less than "V2"). It is determined at step 108 whether or not the idle switch 32 is "OFF".

With "YES" at all steps 102 through 108, it is indicated that the running state of the internal combustion engine 2 conforms to the preset conditions. Then, the degree of throttle opening "th" is checked to determine under which category between the first phase and the fifth phase the loaded state of the internal combustion engine 2 falls (step 110). The fuel increase or decrease of "F1" to "F3" and the ignition timing retardations of "T1" to "T3" are read from the control value map shown in FIG. 4.

As shown in FIG. 3, control is executed so that an increase or decrease in a fuel amount and a retardation of the ignition timing vary, according to the loaded state of the engine 2, with amounts of "F1" to "F3" and "T1" to "T3" (step 112), which are read from the first phase to the fifth phase determined at step 110. Then, this control is returned to step 102.

With "NO" at any one of step 102 through step 108, this control is not allowed to activate. To be specific, when cooling water temperature "t" is above set value "t1" (i.e., "t" is greater than "t1"), the above-described control for step 112 is aborted (step 114). As a consequence, control is terminated when "t" is equal to or less than "t1" after returning from step 112 to step 102. With "NO" at steps 104 through 108, control is returned to step 102.

As can be seen from the above description, when the internal combustion engine 2 is running in a state which complies with the preset conditions, the reference fuel injection quantity is regulated by the control station 30 so as to increase and decrease by amount "F" different from the cylinder #1 to the cylinder #4 without a change in the total of the reference fuel injection quantity. At the same time, this fuel increase or decrease "F" is regulated by the control station 30 so as to change alternately to one of values "F1" to "F3" according to the loaded state of the internal combustion engine 2. Furthermore, the reference ignition timing is controlled by the control station 30 so as to retard by amount "T" different from the cylinder #1 to the cylinder #4. At the same time, this retardation "T" is controlled by the control station 30 so as to change alternately to one of values "T1" to "T3" according to the loaded state of the internal combustion engine 2.

As a consequence, the ignition timing is, of course, retarded, as is the case with prior art. What's more, the fuel injection quantity varies from cylinder #1 to cylinder #4 according to the loaded state of the internal combustion engine 2, while the total of the reference fuel injection quantity, which is set for each of the cylinders #1 to #4 in accordance with the loaded state of the engine 2, remains unchanged, thereby feeding fuel thereinto. Moreover, the ignition timing differs from the cylinder #1 to the cylinder #4, depending on the loaded state of the engine 2, thereby producing spark ignition therein.

In this way, the fuel injection quantity and the ignition timing vary between cylinder #1 to cylinder #4 according to the loaded state of the engine 2, without detracting from operability at a light-loaded operation phase of the engine 2, such as commonly occurs in the prior art devices.

In addition, there are such variations in the fuel injection quantity and the ignition timing with the cylinders #1 to #4 according to the loaded state of the engine 2, thereby allowing exhaust gas temperatures to rise more properly, as compared with the prior art devices in which the ignition timing alone is simply varied. As a result, the catalyst 20 can be activated faster, and an exhaust-purifying function can promptly be exercised to achieve exhaust gas purification.

Furthermore, the control station 30 provides for varying the fuel injection quantity and the ignition timing from the cylinder #1 to the cylinder #4 according to the loaded state of the internal combustion engine 2 by the use of existing controlling means in the engine 2. As a consequence, such control can be effected without the need for additional components therein, thereby achieving a lower cost.

Moreover, temperatures of the catalyst 20, which are detected by the catalyst temperature sensor 46, may be added as one condition to the preset conditions in determining the running state of the internal combustion engine 2. More proper control is thereby provided in consideration of catalyst temperatures, which is advantageous for practical purposes.

As can be seen from the above details, the present invention not only retards ignition timing, as in prior art devices, but also varies a fuel injection quantity with each cylinder according to a loaded state of the internal combustion engine without a change in the total of the fuel injection quantity, thereby supplying fuel thereinto. In addition, the present invention varies the ignition timing with each cylinder according to the loaded state of the engine, thereby producing spark ignition therein.

As a result, the fuel injection quantity and the ignition timing differ from one cylinder to another in dependence upon to the loaded state of the engine, without detracting from operability at a light-loaded operation phase of the engine, which commonly occurs in the prior art. In addition, there are such variations in the fuel injection quantity and the ignition timing with each cylinder according to the loaded state of the engine, thereby allowing exhaust gas temperatures to rise more properly, as compared with the prior art in which the ignition timing alone is simply varied. As a result, a catalyst can be activated faster, and an exhaust-purifying function can promptly be exercised to achieve exhaust gas purification. Furthermore, a control station provides for varying the fuel injection quantity and the ignition timing with each cylinder according to the loaded state of the internal combustion engine by the use of existing controlling means in the engine. As a result, such control can be effected without the need for additional components therein.

Figure 6:
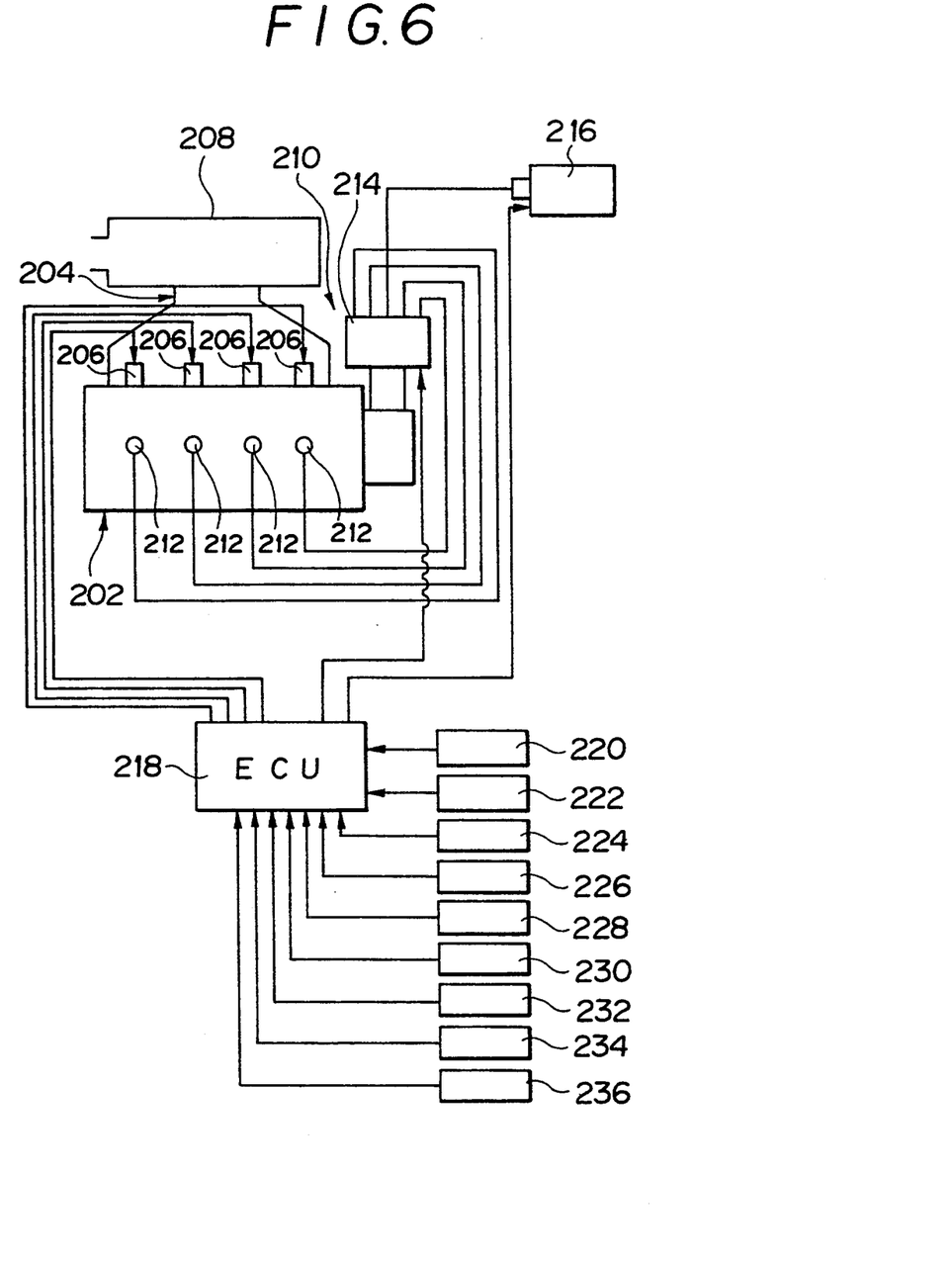
FIG. 6 is a systematic block diagram, showing a fuel injection control system for use in an internal combustion engine, according to a second embodiment of the invention.
Figure 7:
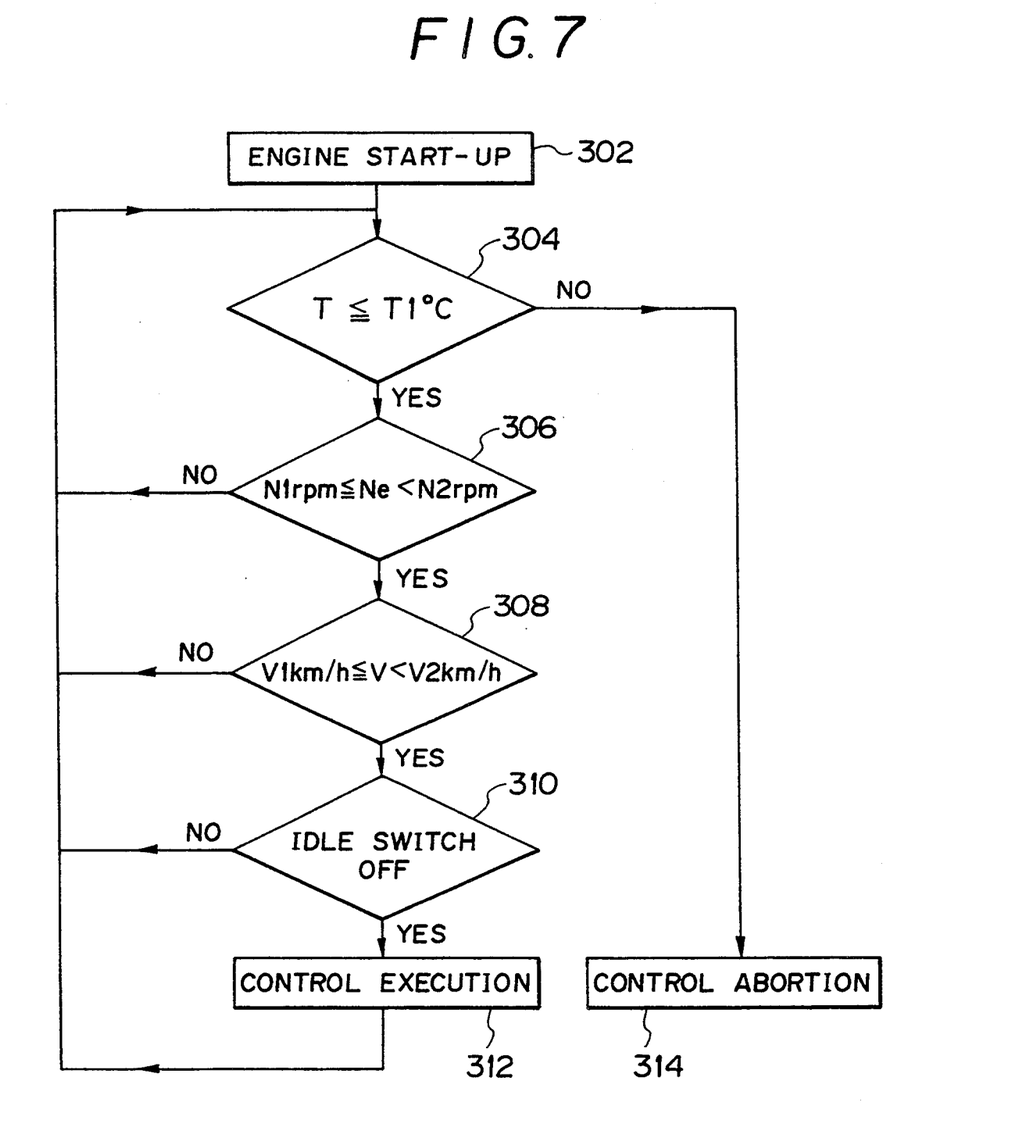
FIG. 7 is a flow chart showing fuel injection control.
Figure 8:
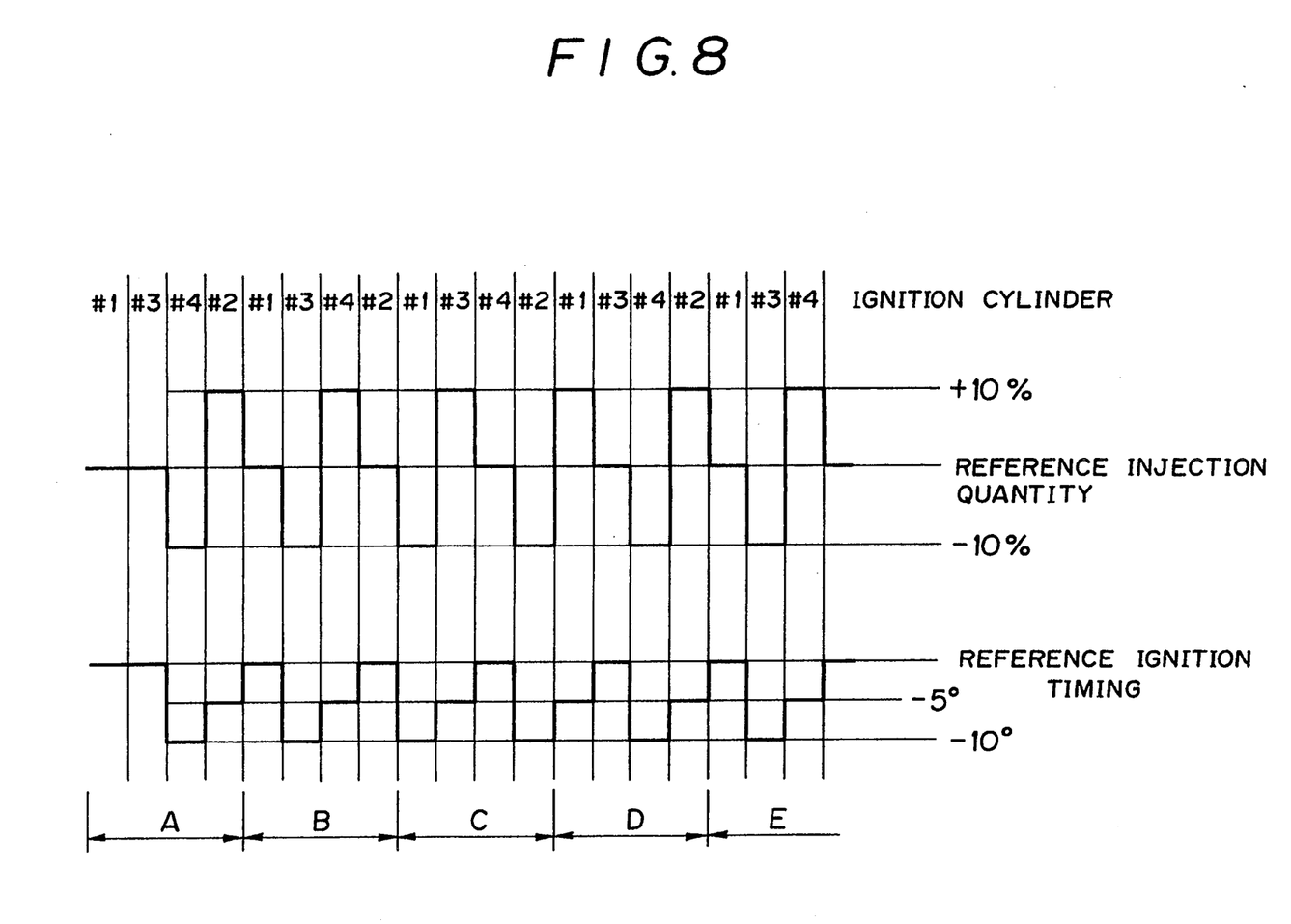
FIG. 8 is a time chart showing intermittent control over variations in fuel injection quantity and ignition timing for a four cylinder engine.

Specific details of a second embodiment of the invention will now be provided with reference to FIG. 6 to FIG. 8 of the accompanying drawings. Referring to FIG. 6, reference numeral 202 represents an internal combustion engine with four cylinders, which engine is disposed in a vehicle; reference numeral 204 is an inlet manifold; the four reference numerals 206 represent fuel injection valves, which are provided at different cylinders; and, reference numeral 208 is an air cleaner. An exhaust system of the internal combustion engine 202 is provided with a catalytic converter (not shown) which reduces noxious exhaust ingredients.

The internal combustion engine 202 is provided with: four spark plugs 212, one for each of the cylinders, so as to constitute an electronic-controlled ignition control device 210; and, a distributor 214 which communicates with the spark plugs 212. The distributor 214 is also in communication with an ignition coil 216.

The fuel injection valves 206, the distributor 214, and the ignition coil 216 are in communication with a controlling means (ECU) 218 such as a programmable computer.

The controlling means 218 further communicates with: an idle switch 220, which is put to ON at the time of idling running of the internal combustion engine 2; a vehicle velocity sensor 222 for detecting vehicle speed; an engine crank angle-detecting sensor 224 for detecting crank angle state; an engine speed sensor 226 for detecting engine speed; a load-detecting sensor 228 (for example, a throttle sensor) for detecting a load state of the internal combustion engine 202; a cooling water temperature sensor 230 for detecting temperatures of cooling water in the engine 202; an intake-air temperature sensor 232 for detecting temperatures of inducted air which is supplied to the engine 202; an ignition pulse-detecting sensor 234 for detecting an ignition pulse; and, a catalyst temperature sensor 236 for detecting temperatures of a catalyst body in the catalytic converter.

Signals from those different sensors are entered into the controlling means 218, which then calculates a reference injection quantity of fuel per cylinder and reference ignition timing associated therewith on the basis of, for example, the engine speed and an intake air quantity. When the internal combustion engine 202 is started at low temperatures, the controlling means 218 actuates and controls the fuel injection valves 206 in order to alter a proportion of a fuel injection quantity between the cylinders while maintaining a constant quantity of fuel injected into the internal combustion engine 2 for each period of ignition. The controlling means 218 also operates and controls the distributor 214 so as to change each delay angle of ignition timing per cylinder.

Next, operations of this embodiment will be described with reference to the flow chart of FIG. 7 and the time chart of FIG. 8.

In the controlling means 218, start-up of the internal combustion engine 202 activates a program (step 302). The program initially determines whether or not temperature (T) of cooling water or the catalyst is equal to or less than set temperature (T1) (step 304).

With "YES" at step 304, it is then determined that the internal combustion engine 202 is being started at low temperatures. The program then determines whether or not engine speed (Ne) is equal to or greater than a first-set rotational frequency (N1), but is less than a second-set rotational frequency (N2) (step 306). Engine speed (Ne) is thus specified within those given limits for the purpose of making allowance for operating performance at low and high-revolution bands.

With "YES" at step 306, the program then determines whether or not vehicle velocity (V) is equal to or greater than a first-set vehicle velocity (V1), but is less than a second-set vehicle velocity (V2) (step 308). Vehicle velocity (V) is thus specified within those given limits for the purpose of allowing for a low-speed band and a racing state.

With "YES" at step 308, the program then determines whether or not idle switch 220 is OFF (step 310). This is done in order to take account of operating performance because control according to the present embodiment is not effected during idling running.

With "YES" at step 310, as shown in FIG. 8, the proportion of the fuel injection quantity between the cylinders is altered (a rise or fall in an amount of fuel) for each period of ignition, with each delay angle of the ignition timing per cylinder being changed (step 312).

To be specific, with first ignition A of FIG. 8, fuel amounting to the reference injection quantity is supplied to first cylinder (#1) and third cylinder (#3). However, the fuel injection quantity for fourth cylinder (#4) is decreased by ten percent from the reference injection quantity, with a correspondingly ten-percent increase in that for second cylinder (#2). At this time, first cylinder (#1) and third cylinder (#3) assume the reference ignition timing, while fourth cylinder (#4) and second cylinder (#2) acquire individual ignition timing which is delayed by ten degrees and five degrees respectively from the reference ignition timing.

With the second ignition B of FIG. 8, fuel amounting to the reference injection quantity is supplied to first cylinder (#1) and second cylinder (#2). On the other hand, the fuel injection quantity for third cylinder (#3) is decreased by ten percent from the reference injection quantity, with a correspondingly ten-percent increase in that for fourth cylinder (#4). At this time, first cylinder (#1) and second cylinder (#2) assume the reference ignition timing, while third cylinder (#3) and fourth cylinder (#4) acquire individual ignition timing which is delayed by ten degrees and five degrees respectively from the reference ignition timing. In this way, the total amount of fuel injected into the internal combustion engine 202 remains constant with each period of ignition.

As shown in FIG. 8, with each period of subsequent ignition (ignition C, D, and so on), the proportion of the fuel injection quantity between the cylinders and the ignition timing associated therewith are altered in a similar manner.

That is, in the internal combustion engine 202 with four cylinders, the proportion of the fuel injection quantity between the cylinders is altered without a change in the total quantity of fuel injected into the engine 202. In addition, the proportion of the fuel injection quantity and the delay angle of the ignition timing are varied according to a pattern of three-four time (i.e., the number of the cylinders minus one) so as to avoid concentrating specific conditions on a certain cylinder. The program is returned to step 304 after this control is completed.

With "NO" at steps 306, 308, and 310, the program is backed up to step 304 to continue the above-described determination.

"NO" at step 304 indicates that temperature T is higher than set temperature T1 and the engine 202 is not being started at low temperatures. Thus, the above-described control over the fuel injection quantity and the ignition timing is aborted (step 314).

As a consequence, when the internal combustion engine 202 is started at low temperatures, the fuel injection quantity and the ignition timing vary with each period of ignition according to the cylinders. Variations in a combustion state raises catalyst temperatures faster than in previous cases, thereby achieving a rapid rise in catalyst temperatures. This accelerates activity of the catalyst, thereby allowing a successful reduction in noxious exhaust ingredients.

Furthermore, in the present embodiment, the program for the controlling means 218 simply has to be changed without the need for new and additional components, thereby achieving an economical cost.

As can be seen from the above-described details, the present invention provides a controlling means, which alters a proportion of a fuel injection quantity between cylinders while invariably maintaining the total quantity of fuel injected into an internal combustion engine with each period of ignition when the internal combustion engine is started at low temperatures, the controlling means changing each delay angle of ignition timing per cylinder. As a result, catalyst temperatures rise faster than in previous cases, which accelerates activity of the catalyst. The occurrence of noxious exhaust ingredients can thereby be successfully reduced.

Furthermore, the above structure according to the present invention can be taken care of by only a program for a controlling means without the need for new components, thereby achieving an economical cost.

What is claimed is:

1. A fuel injection control system for use in an internal combustion engine having a catalyst in an exhaust path thereof, comprising the improvement wherein: each cylinder is provided with fuel injection valve for injecting fuel therein amounting to a reference fuel injection quantity which is established according to a loaded state of said internal combustion engine; each cylinder is provided with a spark plug for producing spark ignition therein at each period of reference ignition timing which is established according to the loaded state of said internal combustion engine; and, controlling means for (1) controlling said fuel injection valve such as to increase and decrease said reference fuel injection quantity by a different amount per cylinder without a change in a total of said reference fuel injection quantity and (2) varying this fuel increase and decrease according to the loaded state of said internal combustion engine, said controlling means further controlling said spark plug such as to retard said reference ignition timing by an amount different from one cylinder to another and varying this retardation according to the loaded state of said internal combustion engine, such control being effected by said controlling means only when said internal combustion engine is running in a state which fulfills predetermined conditions.

2. A fuel injection control system for use in an internal combustion engine having multi-cylinders to control injection of fuel into said internal combustion engine by means of fuel injection valves in response to an ignition signal, said fuel injection control system comprising: a controlling means which alters a proportion of a fuel injection quantity between said cylinders while maintaining constant the total amount of fuel injected into said internal combustion engine for each period of ignition when said internal combustion engine is started at low temperatures, said controlling means also changing each delay angle of ignition timing per cylinder.

* * * * *